United States Patent [19]

Fink

[11] Patent Number: 5,236,585
[45] Date of Patent: Aug. 17, 1993

[54] OIL ACCUMULATOR

[76] Inventor: Ronald G. Fink, 191 Commodore Dr., Jupiter, Fla. 33477

[21] Appl. No.: 846,469

[22] Filed: Mar. 4, 1992

[51] Int. Cl.$^5$ .............................................. C02F 1/40
[52] U.S. Cl. ................................. 210/242.3; 210/256; 210/259; 210/301; 210/521; 210/538
[58] Field of Search ................... 210/242.3, 256, 259, 210/305, 307, 299, 513, 521, 522, 538, 540, DIG. 5, 300, 301, 122

[56] References Cited

U.S. PATENT DOCUMENTS

| | | | |
|---|---|---|---|
| 95,924 | 10/1869 | Molinier | 210/54 D |
| 365,259 | 6/1887 | Ide | 210/54 D |
| 700,056 | 5/1902 | Kremer | 210/538 |
| 745,519 | 12/1903 | Pravicha et al. | 210/513 |
| 1,147,881 | 7/1915 | Morris | 210/540 |
| 1,647,344 | 11/1927 | Cushman | 210/54 D |
| 1,825,550 | 9/1931 | Schulte | 210/521 |
| 2,608,300 | 8/1952 | Small | 210/242.3 |
| 3,810,832 | 5/1974 | Rhodes | 210/DIG. 5 |
| 4,252,649 | 2/1981 | Favret, Jr. | 210/538 |
| 4,315,822 | 2/1982 | Jaisinghani | 210/DIG. 5 |
| 4,356,090 | 10/1982 | Tran | 210/DIG. 5 |
| 4,844,819 | 7/1989 | Norman | 210/521 |

Primary Examiner—Christopher Upton
Attorney, Agent, or Firm—Malin, Haley, DiMaggio & Crosby

[57] ABSTRACT

An oil accumulation system having a first separating station and a second separating station, wherein the first separating station includes a tank for receiving contaminated water with an inclined plate separator disposed therein. The tank has an adjustable skimmer which delivers oily waste water to the second separating station by gravity. The second separating station includes an outer housing which encompasses an inner housing, forming two interior chamber. The inner chamber collects the oily waste from the skimmer for additional oil/water separation by use of a first laminar flow area, or alternatively by use of a fiber foam filter. At the bottom of the inner housing is an outlet, which forms an inlet to the second interior chamber, so that water is gravity-forced from the first chamber to the second chamber, forming a second laminar flow area for further oil/water separation. The outer housing has an outlet proximal its lower end connected to a vertical standpipe for maintaining a fluid height within the chambers of the housings.

6 Claims, 2 Drawing Sheets 5,236,585

OIL ACCUMULATOR

FIELD OF THE INVENTION

This invention relates to the treatment of waste water, and more particularly, to a device or apparatus for removing oil from treated waste water.

DESCRIPTION OF RELATED ART

Water has always been a fluid having infinite uses but limited supply. Capable of suspending both dissolved and suspended solids, water was considered an inexhaustible fluid and used liberally for cleaning purposes. Population growth proved that water is not inexhaustible and the need for recycling is now well established.

In instances where the water is used for industrial as cleaning objects coated with processes, such as cleaning objects coated with hydrocarbons, removal is not only desired, in many areas of the country it is required. Standards set forth by governmental agencies, such as the Environmental Protection Agency, are increasingly becoming more stringent regarding types and amounts of materials which are allowed to be discharged. It should be noted that it is against the law to discharge oil or grease in U.S. waterways or ground water supplies.

Gasoline, kerosene, and miscellaneous solvents are but a few of the light hydrocarbons found in industrial processing such as degreasing or cleaning situations. However, it is the heavier hydrocarbons such as crude oil, diesel oil, road tar, and grease which create the problems to which this invention addresses. Grease is not a specific chemical compound but rather a general group of semi-liquid materials which may include soaps, waxes and other similar materials extractable into hexane.

It is well known that separation of oil and grease from water can be performed by gravity separation. In theory, the separation process can be predicted by Stoke's law. Thus, the effectiveness of gravity separation depends upon proper hydraulic design and retention time. Despite the theoretical approach, problems continue to affect gravity separation including the variation of influent waste fluids occurring nearly and mechanical system design shortcomings preventing accurate separation prediction. For this reason, elaborate treatment systems have been developed to ensure proper retention periods and provide areas for laminar flow.

Treatment systems for removing the hydrocarbons include the use of devices such as wheels, drums, belts or ropes wherein oil attaches to the device and is then scraped off. One such treatment system that is very effective in removing oil is U.S. Pat. No. 4,859,329 issued to Fink which illustrates the use of a wheel for the removal of oil. However, a problem with the use of any such device occurs in the removal of heavy oil or grease. In these situations the scraping mechanism has a tendency to plug thereby limiting the treatment system to fluids having certain types of waste, namely light hydrocarbons. Another problem with the use of wheels, drums, belts and ropes for oil removal is the need for an electric motor.

What is needed is a device that can accommodate heavy oil and grease on a continuous basis without operator assistance allowing oil accumulation and subsequent removal at a singular point in time. Thus, eliminating operator maintenance and associated problems resulting from the use of mechanical devices employed in heavy oil and grease situations. Heretofore, no teaching is made of a device for accumulation of heavy oil and grease from a waste treatment system having inclined oil separator plates. It is, therefore, to the effective resolution of these problems that the instant invention is directed.

SUMMARY OF THE INVENTION

It is the principal feature of the present invention to provide a device that overcomes the problems described above, which, when used in combination with an oil treatment system, removes heavy oil and grease from water.

Generally, the apparatus can be generally described as to an oil accumulator wherein the apparatus is attached to a waste treatment system having an inclined plate separator used for separating solids from oil and for coalescing light hydrocarbons. The oil accumulator is used to replace the scraping devices typically used in oily waste treatment systems when treating high oil concentrations or as a stand alone device having the ability to incorporate an optional disposable fiber foam filter for removal of minuscule amounts of oil.

The oil accumulator includes a skimmer having an elongated inlet made adjustable along a surface of the oily waste treatment system for collection of oil/water (fluid) to be separated. The oil accumulator has an inner and an outer housing, said inner housing forming an interior chamber therein as defined by a top end and a bottom end and a cylindrical wall surface. An inlet is provided near the top end and an outlet provided near the bottom end of the interior chamber. The outer housing forms a second interior chamber defined by a top end and a bottom end and a cylindrical wall surface. The inner chamber is placed within the second chamber with an outlet disposed near the bottom end. The skimmer is made adjustable to the surface of the oily waste and collects a layer of oil/water which has been separated by the inclined plate separator. The collected oil/water is drained to the inlet of the first inner chamber wherein a laminar flow area is formed allowing further separation of the oily waste. Water separated from the waste is forced by gravity to the outlet of the inner chamber thereby entering the second chamber creating a second laminar flow area. Final separated water is gravity forced out of the bottom outlet of the second chamber for return to the oily treatment system. The return outlet is raised to maintain fluid levels in the chambers with an anti-siphon opening to prevent backflow. The oil can be drained periodically from the chambers or a fiber foam filter can be placed within the inner chamber for complete removal of dissolved oil.

Therefore, it is an object of the instant invention to provide an apparatus that removes heavy oil and grease from water thereby eliminating the need for a scraping device.

Yet another object of the instant invention is to provide a gravity oil accumulator that requires no electricity.

Still another object of the instant invention is to provide a skimming means made adjustable to the surface of an oily waste treatment system.

Another object of the instant invention is to provide a dual chamber oil accumulator having a means for insertion of a fiber foam filter.

Another object of the instant invention is to provide a dual chamber oil accumulator requiring minimal physical space resulting from placement of one chamber within a larger chamber.

Other and further objects, features, and advantages of the invention will become evident upon the reading of the following specification taken in conjunction with the drawings.

BRIEF DESCRIPTION OF THE DRAWINGS

The invention will be more readily understood with reference to the accompanying drawings, wherein.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure. The aims and objects of the invention are accomplished by providing a device that allows the gravity oil separation for use in combination with an inclined plate oily waste treatment system.

Figure 1:
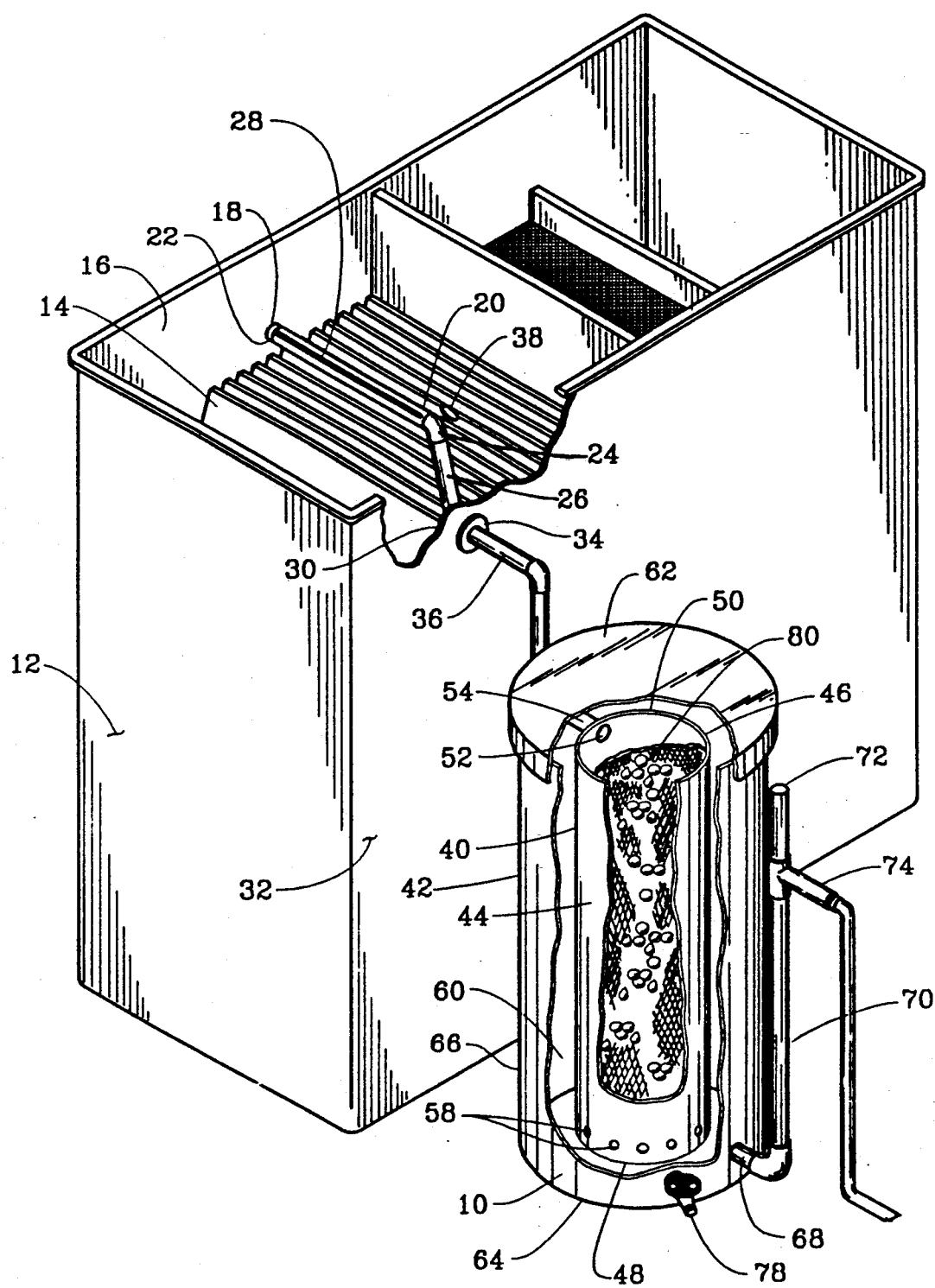
FIG. 1 is a perspective view of an oily waste treatment system used in combination with the oil accumulator system of the instant invention.

Referring to the drawings in more detail, and more particularly to FIG. 1, there is shown a preferred embodiment of invention 10 used in combination with a typical oily waste treatment system 12 having inclined plates 14 for separating solids from oil and coalescing light hydrocarbons. The inclined plates slow down the water traveling through the incline plate reservoir 16 allowing solids to fall by gravity sliding over the top of the inclined plates to the bottom of the reservoir. Hydrocarbons having a natural buoyancy in water will tend to move toward the underside of the incline plates 14 where they will coalesce into larger oil particles making them even more buoyant than the smaller oil particles. This buoyancy causes the oil particles to rise to the top of inclined plates into the upper portion of the reservoir 16.

The oil, which has been coalesced into larger oil particles forms a layer of oil along the upper surface. From this layer a skimmer 18 is placed made from a horizontally placed, hollow, rigid pipe 20 having a cylindrical sidewall made from PVC, CPVC, or the like. One end of the pipe is terminated at closed end 22 and the opposite end forming an outlet by first elbow 24 to substantially vertical hollow coupling pipe 26. A portion of the sidewall of pipe 20 is removed forming an elongated inlet 28 encompassing at least a portion of the distance between end 22 and first elbow 24. Vertical coupling pipe 26 is further coupled to a rotatable elbow 30, not shown, allowing fluid return to a horizontal plane before exiting the reservoir 16 through sidewall 32 at pipe support/seal 34 to horizontal pipe 36. The inlet 28 is made adjustable to the oil layer by rotational movement of vertical coupling pipe 26 about a rotational axis X. It should be noted that elbow 24 can be made rotatable in place of elbow 30 allowing an adjustable inlet by rotation of pipe 20. A handle 38 can be mounted above the water line to allow movement of the skimmer 18 without an operator touching the water.

The oil accumulator employs an inner housing 40 and an outer housing 42. The inner housing 40 forming an interior chamber 44 therein as defined by a open top end 46, a bottom end 48 and a cylindrical wall surface 50. Inlet 52 is provided near open top 46 of the inner housing 40 coupled to coupling pipe 54 extending through the outer housing 42 for connection to the skimmer 18 by a series of conventional piping connections 56, number and length of which is dependent upon physical placement of the oil accumulator in proximity to the waste treatment system 12. It should be noted that by placement of the chamber inlet 52 at a position lower than skimmer inlet 26 accomplishes the necessary transfer of oily waste by gravity thus eliminating the need for a pump.

A plurality of inner chamber outlets 58 are provided near the bottom end 48. The outer housing 42 forming a second interior chamber 60 to as defined by a top end or cover 62, a bottom end 64 and a cylindrical wall surface 66. The inner housing 40 placed within the outer housing 42. The outer housing having an outlet 68 disposed near the bottom end 64 coupled to a vertical standpipe 70 open at a top end 72 that operates as an anti-siphon vent and a transfer coupling 74 located therebetween for delivery of water back to the entry of the oily waste treatment system 12. Transfer coupling 74 placement maintains chamber fluid height as described later in this specification.

Figure 2:
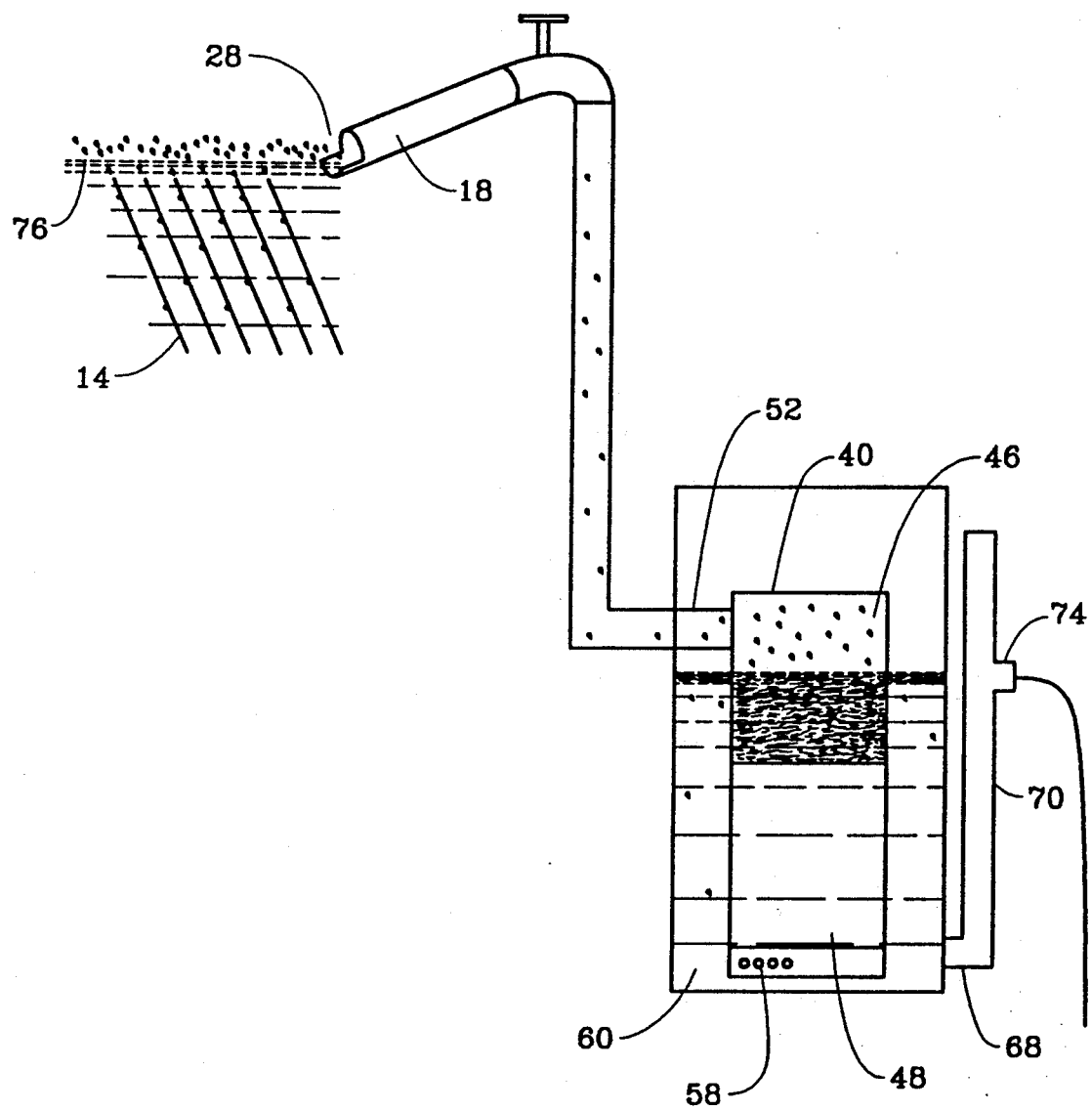
FIG. 2 is a pictorially view of the oil skimmer and accumulator of the instant invention.

Now referring to both FIGS. 1 and 2, the instant invention is made operational by placement of skimmer 18 along the surface of the oil waste treatment system 12 allowing the skimming of the oil layer 76 as separated by the inclined plates 14. The oil layer 76 enters the elongated opening 28 and is gravity fed into inner chamber 40 through inlet 52. The inner chamber 40 forming a first laminar flow area allowing oil separation. As additional oily waste is fed into the chamber 40, water is forced to the bottom 48 while the majority of the buoyant oil remains near the top portion 46. Water is forced through inner chamber outlets 58 into second chamber 60. The second chamber 60 allows additional settling time wherein buoyant oil floats to the top of the second chamber and separated water is forced through outlet 68 into standpipe 70 and finally through transfer coupling 74 for redelivery to the waste treatment system 12. Placement of transfer coupling 74 maintains fluid levels within the chambers.

Oil accumulated within the chambers is periodically drained by valve 78 or can be scooped out of either chamber by removal of cover 62. Alternatively, an oil absorption filter such as a fiber foam filter 80 can be placed within the inner chamber 44 by lifting cover 62 for direct access to the open end 46 of the chamber. Upon exhaustion of the fiber foam filter 80, the cover 62 can be lifted, the filter 80 removed, and a new filter disposed therein. The fiber foam material can be described as spunbound, continuous, filament, polyester, non woven, needle punched engineering fabric.

It will be apparent that modifications in accordance with the present invention can be made by those skilled in the art without departing from the spirit thereof and it is equally apparent that the apparatus can be of a variety of sizes having the above described functionality. It will be obvious to those skilled in the art that various changes may be made without departing from the scope of the invention and the invention is not to be considered limited to what is shown in the drawings and described in the specification.

What I claim as new and desire to secure by Letters Patent of the United States is:

1. An oil accumulation system comprising:
   a first separating station and a second separating station, said first separating station including:
      a tank for receiving contaminated water, said tank having a first means for separating disposed therein, said first means for separating including an inclined plate separator, wherein a layer of oily waste water is formed along the upper surface of said contaminated water;
      a skimmer disposed within said tank, said skimmer having an elongated, horizontally disposed inlet;
   said first separating station delivering said oily waste water to said second separating station by gravity, said second separating station including:
      a first housing forming a first interior chamber therein, said first interior chamber having an upper end and a lower end;
      an inlet disposed proximal said first chamber's upper end, and an outlet disposed proximal said first chamber's lower end, said inlet connected to said skimmer;
      a second housing encompassing said first housing, forming a second interior chamber therein, said second interior chamber having an upper end and a lower end, wherein said first interior chamber's outlet forms an inlet to said second interior chamber, said second interior chamber having an outlet proximal its lower end;
      means for maintaining a fluid level in said first and second interior chambers;
      said skimmer being adjustable along the upper surface of said contaminated water to skim said oily waste water, and being connected to the first chamber inlet for draining said oily waste water into the inlet of said first interior chamber, said first interior chamber being constructed and arranged to form a first laminar flow area therein for additional separation of said oily waste water, so that water separated from said oily waste water is gravity-forced to the outlet of said first interior chamber, thereby entering said second interior chamber, said second interior chamber being constructed and arranged to form a second laminar flow area therein, which further separates said water, said further separated water being gravity-forced to the outlet of said second interior chamber; and
      means for reintroduction of said further separated water to said oil accumulation system.

2. The oil accumulation system according to claim 1 wherein said skimmer is mounted for rotational movement about its longitudinal axis.

3. The oil accumulation system according to claim 1 wherein said inner and outer housings are cylindrical.

4. The oil accumulation system according to claim 1 wherein said outlet of said inner chamber is further defined as a plurality of outlets.

5. The oil accumulation system according to claim 1 wherein said inner housing contains a disposable fiber foam filter.

6. The oil accumulation system according to claim 1 wherein said means for maintaining a fluid level in said first and second interior chambers is further defined as a vertical standpipe connected to said second interior chamber's outlet.

* * * * *